(12) United States Patent
Perkins

(10) Patent No.: US 11,277,574 B1
(45) Date of Patent: Mar. 15, 2022

(54) METHODS AND SYSTEMS FOR MAPPING CAMERA LOCATION AND SELECTING A DESIRED VIEW IN A VIDEO MANAGEMENT SYSTEM

(71) Applicant: Sunrise R&D Holdings, LLC, Cincinnati, OH (US)

(72) Inventor: Dion B. Perkins, Cincinnati, OH (US)

(73) Assignee: SUNRISE R&D HOLDINGS, LLC, Cincinnati, OH (US)

( * ) Notice: Subject to any disclaimer, the term of this patent is extended or adjusted under 35 U.S.C. 154(b) by 0 days.

(21) Appl. No.: 16/837,615

(22) Filed: Apr. 1, 2020

(51) Int. Cl.
*H04N 5/247* (2006.01)
*G06T 7/73* (2017.01)
*H04N 5/232* (2006.01)

(52) U.S. Cl.
CPC .............. *H04N 5/247* (2013.01); *G06T 7/74* (2017.01); *H04N 5/23218* (2018.08); *G06T 2207/30204* (2013.01)

(58) Field of Classification Search
None
See application file for complete search history.

(56) References Cited

U.S. PATENT DOCUMENTS

| | | | | |
|---|---|---|---|---|
| 9,171,341 B1* | 10/2015 | Trandal | .................. | G06Q 50/16 |
| 10,163,266 B2* | 12/2018 | Inoue | ........................ | G06T 7/74 |
| 2003/0154141 A1* | 8/2003 | Capazario | .............. | G06Q 30/02 |
| | | | | 705/26.1 |
| 2011/0064312 A1* | 3/2011 | Janky | ....................... | G06K 9/00 |
| | | | | 382/195 |
| 2015/0205894 A1* | 7/2015 | Faris | ................... | G06Q 30/0207 |
| | | | | 703/21 |
| 2016/0026853 A1* | 1/2016 | Wexler | ............... | G06K 9/00718 |
| | | | | 382/103 |
| 2016/0292918 A1* | 10/2016 | Cummings | .......... | G06Q 10/103 |
| 2017/0061200 A1* | 3/2017 | Wexler | ................ | G06F 16/9535 |
| 2019/0130180 A1* | 5/2019 | Shiraishi | .............. | G06Q 10/087 |
| 2019/0149725 A1* | 5/2019 | Adato | ................ | H04N 1/32144 |
| | | | | 348/158 |
| 2019/0213212 A1* | 7/2019 | Adato | ...................... | G06F 16/55 |
| 2019/0236531 A1* | 8/2019 | Adato | ................ | G06K 9/00771 |
| 2021/0158564 A1* | 5/2021 | Chakravarty | ........ | G06K 7/1456 |

* cited by examiner

*Primary Examiner* — Reza Aghevli
(74) *Attorney, Agent, or Firm* — Stites & Harbison, PLLC; Terry L. Wright; James R. Hayne

(57) ABSTRACT

Methods and systems for mapping camera location and selecting a desired view in a video management system make use of images showing fiducial markers to identify camera location and desired camera views. In one implementation, a central computer receives an image obtained by a camera showing a fiducial marker with indicia. The image is processed to determine the identity of the fiducial marker. Location information associated with the identity is retrieved from a database and used to identify the location of the camera. In another implementation, images of fiducial markers obtained by a plurality of cameras are used to select a subset of fiducial markers identified as being present at a desired location. Based on that subset of fiducial markers, each of the cameras being present at that desired location are then identified.

20 Claims, 9 Drawing Sheets

METHODS AND SYSTEMS FOR MAPPING CAMERA LOCATION AND SELECTING A DESIRED VIEW IN A VIDEO MANAGEMENT SYSTEM

TECHNICAL FIELD

The present invention relates to systems and methods for mapping camera location and selecting a desired view in a video management system. In particular, the present invention relates to systems and methods that make use of images showing fiducial markers to identify the location of cameras and display desired camera views in a video management system.

BACKGROUND

Retailers, including grocery stores, often utilize a video management system ("VMS") to monitor different interior and exterior areas of a store. Typically, the VMS includes a plurality of cameras that are positioned at different locations in or around a store to provide a visual feed, which can then be displayed to enable authorized users to remotely view the different locations to which the cameras correspond. Accordingly, VMSs can be used to improve or prevent security breaches, to identify instances of theft, and to quickly identify instances where the quantity of a product is low or otherwise needs restocked.

However, in large enterprises having a multitude of store locations, the naming conventions used to identify a camera location across different store locations often varies, thus making it difficult to ascertain the location to which a particular camera feed corresponds or to select a particular view within the VMS that shows a particular location. Such inconsistency is often due to the fact that the location assigned to cameras within a VMS is based exclusively on input either defined or selected by different individuals across various store locations. In retail situations, such as in grocery stores, where there is a high volume of customers entering and exiting a store location and a high volume of product sales, this inconsistency is particularly problematic as the inability to quickly identify the location at which a particular camera within the VMS is positioned or to quickly display a desired view inhibits the overall utility of the VMS. For instance, such deficiencies can inhibit a retailer's ability to successfully monitor a suspected shoplifter or to quickly identify instances where a particular item needs to be restocked, thereby leading to out-of-stock conditions and, consequently, missed sales opportunities. Accordingly, methods and systems that allow for improved camera location mapping and for view selection in a VMS would be both highly desirable and beneficial.

SUMMARY

The present invention relates to methods and systems for mapping camera location and displaying a desired view in a video management system. In particular, the present invention relates to methods and systems that make use of images showing fiducial markers to identify the location of cameras and display desired camera views in a video management system.

In an exemplary embodiment, a system for mapping camera location and displaying a desired view in a video management system includes one or more fiducial markers, a central computer, a database that stores information about each fiducial marker present in the system, and one or more cameras positioned to obtain images of the fiducial markers. In some embodiments, the system further includes one or more displays configured to display a visual feed showing the field of view of the one or more cameras within the system. The database, the one or more cameras, and the one or more displays are each in communication with the central computer. In some embodiments, the central computer, the database, the one or more cameras, and the one or more displays are each respective components of a video management system ("VMS"). The VMS can be implemented within and configured to monitor different locations of a store, such as a grocery store.

Each fiducial marker within the system includes indicia, which corresponds to an identity of the fiducial marker. In some embodiments, the indicia includes an inner binary matrix, which corresponds to the identity of the fiducial marker, and an outer border enclosing the inner binary matrix. The identity of each fiducial marker within the system has at least location information and/or product information associated with it. The location information typically corresponds to a predetermined location at which the fiducial marker is positioned, and the product information typically corresponds to a particular product or group of products located in close proximity to the location at which the fiducial marker is positioned. Information regarding the identity of each fiducial marker as well as the location information and/or product information associated with the fiducial marker is stored within the database, such that the location information and/or product information associated with each fiducial marker can be queried by the central computer.

In an exemplary implementation of a method for mapping camera location in a video management system, an image obtained by a camera, which shows the indicia of a fiducial marker having an identity associated with location information, is received on a central computer. The received image is processed by the central computer to determine the identity of the fiducial marker based on the indicia shown in the image. The central computer retrieves and receives the location information associated with the determined identity, and thus the physical location of the fiducial marker, by querying the database using the determined identity of the fiducial marker. The central computer subsequently identifies the location of the camera having obtained the image of the fiducial marker based on the identified location of the fiducial marker. The database can then be updated to store information regarding the location of the camera. In some implementations, a feed transmitted from the camera corresponding to the field of the view is transmitted to one or more of the displays for display thereon. To identify the subject matter represented within the feed, the central computer, in some implementations, generates an overlay corresponding to the identity of the fiducial marker and/or the determined location of the camera and transmits the same to the one or more displays for display thereon.

In some implementations, the exemplary method for mapping camera location may further include mapping the location of a product represented within the image that was used to map camera location. To this end, in some implementations, the central computer is configured to process the image to determine the identity of a product represented within the image. After determining the identity of the product, the central computer subsequently identifies the location of the product as being the same as the determined location of the camera. The database can then be updated to store information regarding the location of the product.

In an exemplary implementation of a method for displaying a desired view in a video management system, images obtained from a plurality of cameras are received on a central computer, where each image received shows indicia corresponding to the identity of one or more fiducial markers. The identity of each fiducial marker is associated with location information and/or product information. The received images are processed to determine the identity of each fiducial marker based on its indicia. The central computer then retrieves and receives information about a location of each of the one or more fiducial markers based on the determined identity of each of the fiducial markers. Using the identities of the selected subset of fiducial markers, the central computer selects one or more fiducial markers identified as being present at a particular, desired location. A camera or subset of cameras is then identified by the central computer as corresponding to or showing the desired location by identifying each of the cameras that obtained images of the selected fiducial markers identified as being present at that desired location.

Further features and advantages of the present invention will become evident to those of ordinary skill in the art after a study of the description, figures, and non-limiting examples in this document.

DESCRIPTION OF EXEMPLARY EMBODIMENTS

The present invention includes methods and systems for mapping camera location and displaying a desired view in a video management system. In particular, the present invention relates to methods and systems that make use of images showing fiducial markers to identify the location of cameras and select or display a desired camera view in a video management system.

Figure 1:
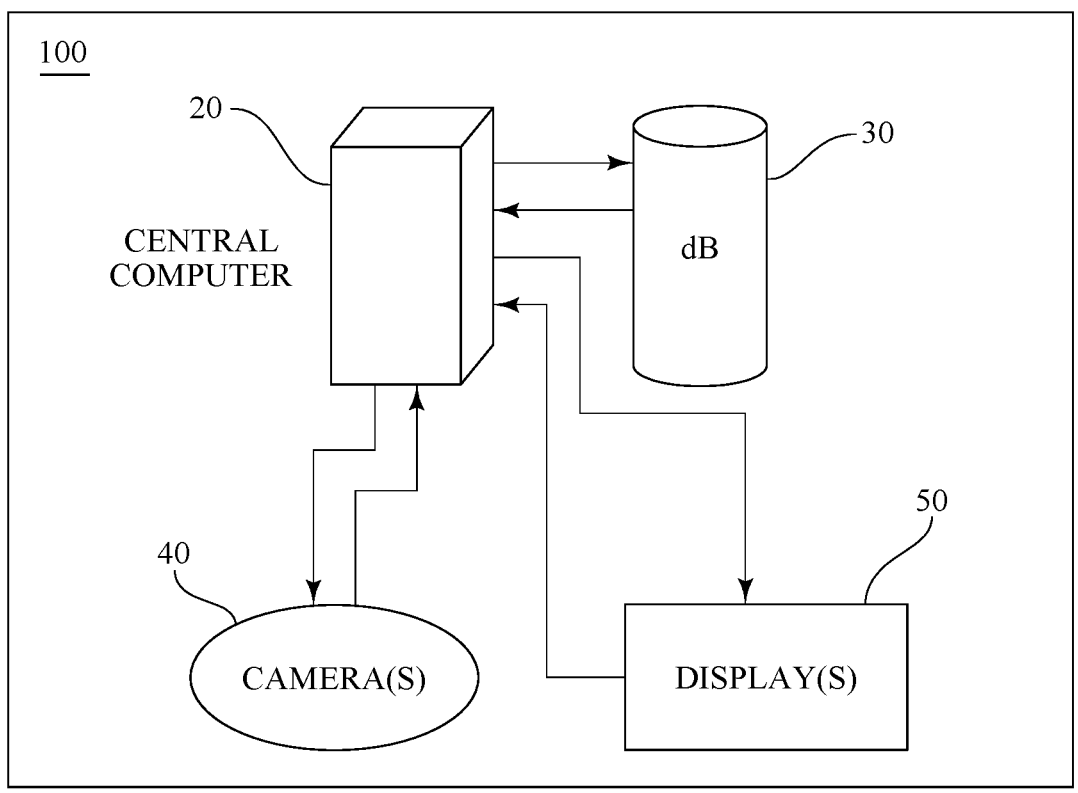
FIG. 1 is a schematic diagram showing a central computer, a database, one or more cameras, and one or more displays of an exemplary system for mapping camera location and selecting and displaying a desired view in a video management system.

Referring first to FIGS. 1-4, in an exemplary embodiment of a system for mapping camera location and displaying a desired view in a video management system, the system comprises: one or more fiducial markers 10a, 10b, 10c, 10d; a central computer 20; a database 30 configured to store data about or associated with the one or more fiducial markers 10a, 10b, 10c, 10d; one or more cameras 40, where each camera 40 is configured to capture images of fiducial markers 10a, 10b, 10c, 10d within the field of view of the camera 40; and one or more displays 50. As shown in FIG. 1, in this exemplary embodiment, the central computer 20, the database 30, the one or more cameras 40, and the one or more displays 50 are components of a larger video management system ("VMS") 100.

Figure 2:
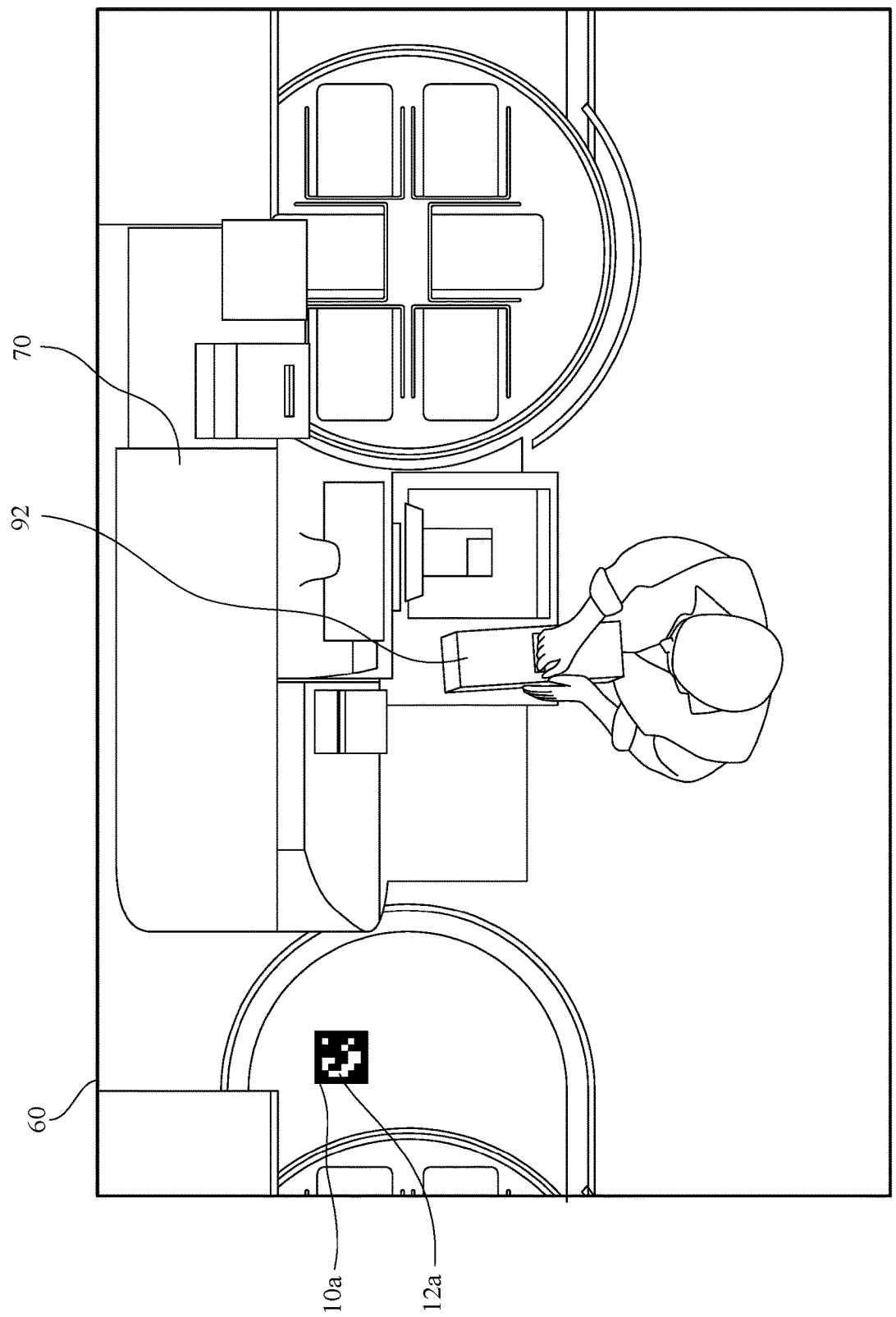
FIG. 2 is a representative image obtained by a camera included in the system of FIG. 1 and showing a first fiducial marker.
Figure 3:
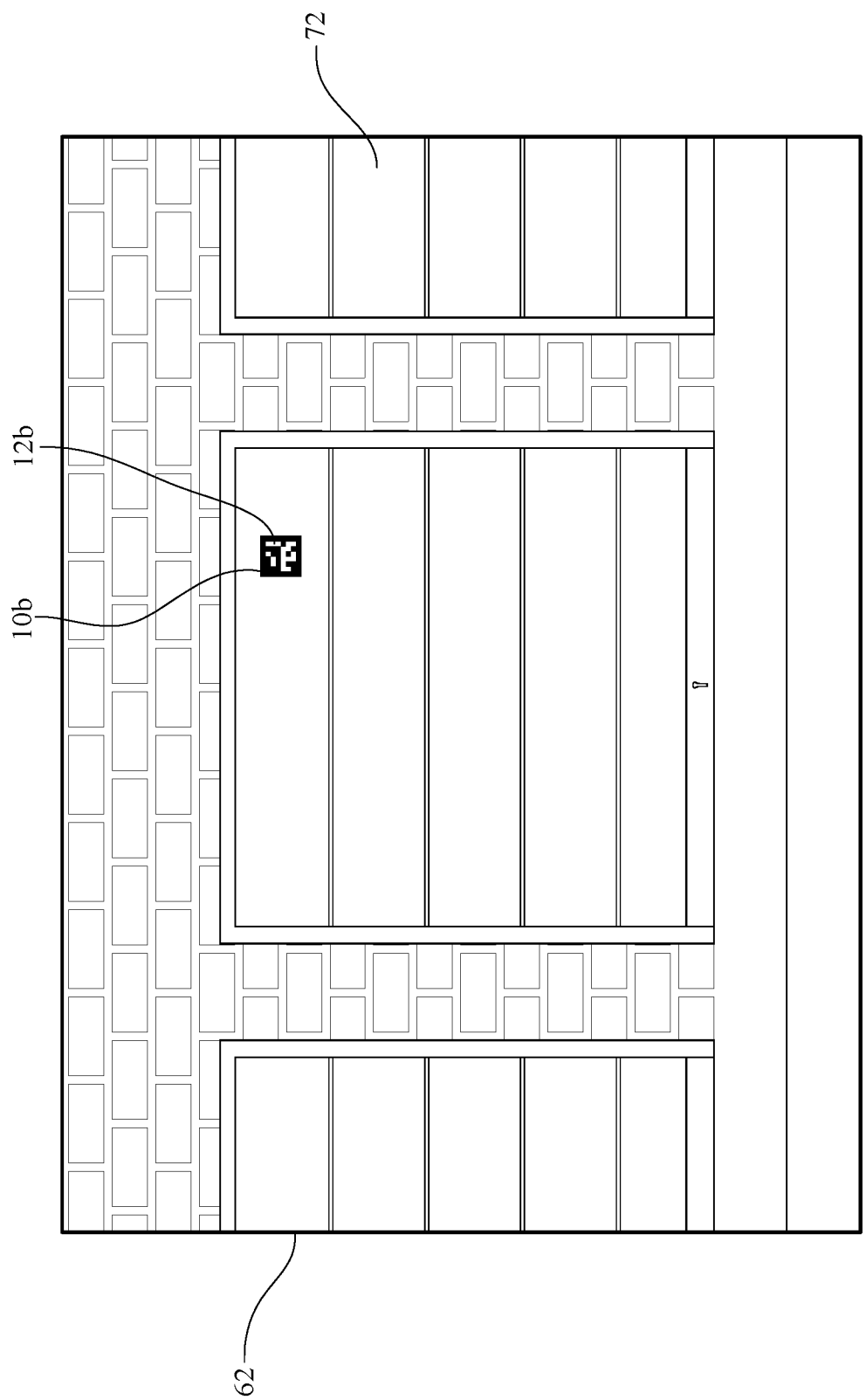
FIG. 3 is another representative image obtained by a camera included in the system of FIG. 1 and showing a second fiducial marker.
Figure 4:
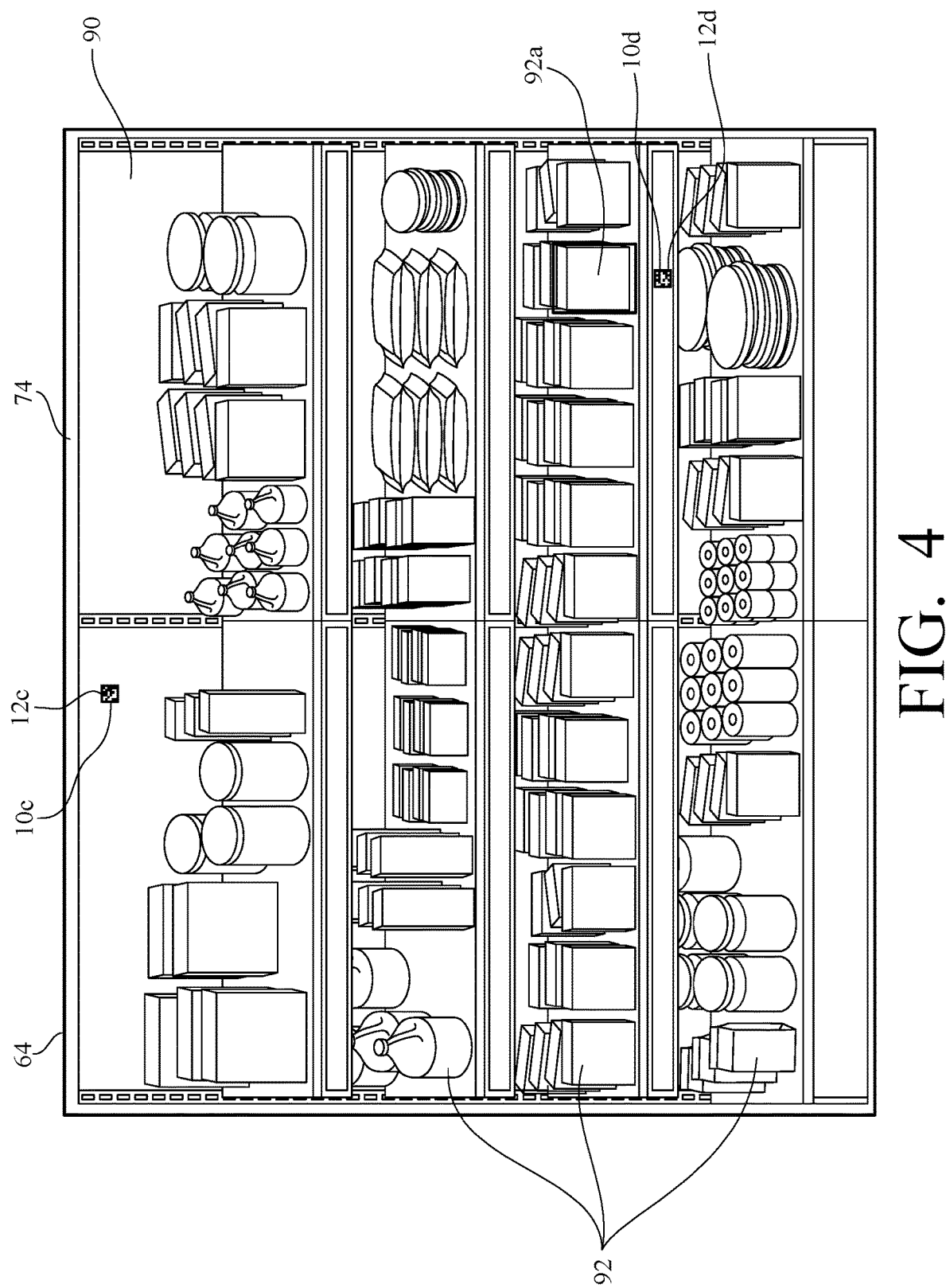
FIG. 4 is another representative image obtained by a camera of the system of FIG. 1 and showing a third fiducial marker and a fourth fiducial marker.

As shown in FIGS. 2-4, the VMS 100 is configured and used to allow for remote monitoring of three different locations within the interior of a grocery store. Further, in this exemplary embodiment, the system includes four fiducial markers 10a, 10b, 10c, 10d: a first fiducial marker 10a positioned in a first location 70 of the store, a second fiducial marker 10b positioned in a second location 72 of the store, and a third and fourth fiducial marker 10c, 10d positioned in a third location 74 of the store. Of course, the VMS 100 can also be configured and used to provide remote monitoring of further and/or different locations, either at a single store or across multiple stores, without changing the principle operation of the system of the present invention. Accordingly, the number of fiducial markers 10a, 10b, 10c, 10d as well as the number of cameras 40 utilized within the system can vary depending on the environment(s) in which the VMS 100 is implemented and designed to monitor.

Referring now generally to FIGS. 2-5, each fiducial marker 10a, 10b, 10c, 10d within the system includes indicia 12a, 12b, 12c, 12d, which corresponds to the identity of the fiducial marker 10a, 10b, 10c, 10d. In this particular embodiment, each fiducial marker 10a, 10b, 10c, 10d within the system is an ArUco marker, where the indicia 12a, 12b, 12c, 12d of each fiducial marker 10a, 10b, 10c, 10d includes an inner binary matrix 14 and an outer border 16, as perhaps shown best in FIG. 5. The inner binary matrix 14 within the indicia 12a, 12b, 12c, 12d corresponds to the identity of the fiducial marker 10a, 10b, 10c, 10d. For instance, the inner binary matrix 14 shown within the indicia 12a of the first fiducial marker 10a shown in FIGS. 2 and 5 may correspond to an identity of "21", while the binary matrix shown within the indicia 12b of the second fiducial marker 10b shown in FIG. 3 may correspond to an identity of "2". Accordingly, fiducial markers 10a, 10b, 10c, 10d having different identities will have a different inner binary matrix 14 represented within its indicia 12a, 12b, 12c, 12d. The outer border 16 surrounds the inner binary matrix 14 and aids the central computer 20 in identifying the presence of a fiducial marker 10 within an image taken by a camera 40 of the system, as described below. As best exemplified in the enlarged view of the first fiducial marker 10a shown in FIG. 5, in this particular embodiment, the indicia 12a, 12b, 12c, 12d of each fiducial marker 10a, 10b, 10c, 10d includes a 6×6 inner binary matrix 14 defined by a mixture of shaded squares. Reference numerals 1-6 have been provided along the top and left-side borders of the first fiducial marker 10a shown in FIG. 5 to better illustrate the positioning of the inner binary matrix 14 within the outer border 16. As such, reference numerals 1-6 in FIG. 5 form no part of the first fiducial marker 10a shown therein. Furthermore, in this particular embodiment, the inner binary matrix 14 is a colored matrix defined by a mixture of black squares and white squares that represent different binary values, such as 0s and 1s.

In some embodiments, the identity of each fiducial marker 10a, 10b, 10c, 10d may be a value derived from the conversion of the binary values within the inner binary matrix 14 to a decimal base number. Alternatively, the identity to which the inner binary matrix 14 of the indicia 12a, 12b, 12c, 12d corresponds may be another assigned value, such as an index or key value within a data structure, e.g., a dictionary, in which information regarding the fiducial markers 10a, 10b, 10c, 10d of the system is contained.

Although the fiducial markers 10a, 10b, 10c, 10d described above and illustrated in FIGS. 2-5 are identified as ArUco markers, the system can also utilize other fiducial marker types or designs, such as those provided by the STag, ARToolKit+, or RUNE-Tag fiducial marker systems and still enable the system of the present invention to function for its intended purpose. Indeed, alternative embodiments are also contemplated where the one or more fiducial markers 10 are defined by numeric values, alphabetical characters, images, or combinations thereof, which may be captured by the one or more cameras 40 and processed by the central computer 20 in the manner described below. In some embodiments, the types of fiducial markers utilized are only restricted by their ability to be sufficiently resolved by the particular camera used in accordance with the present invention.

Figure 8:
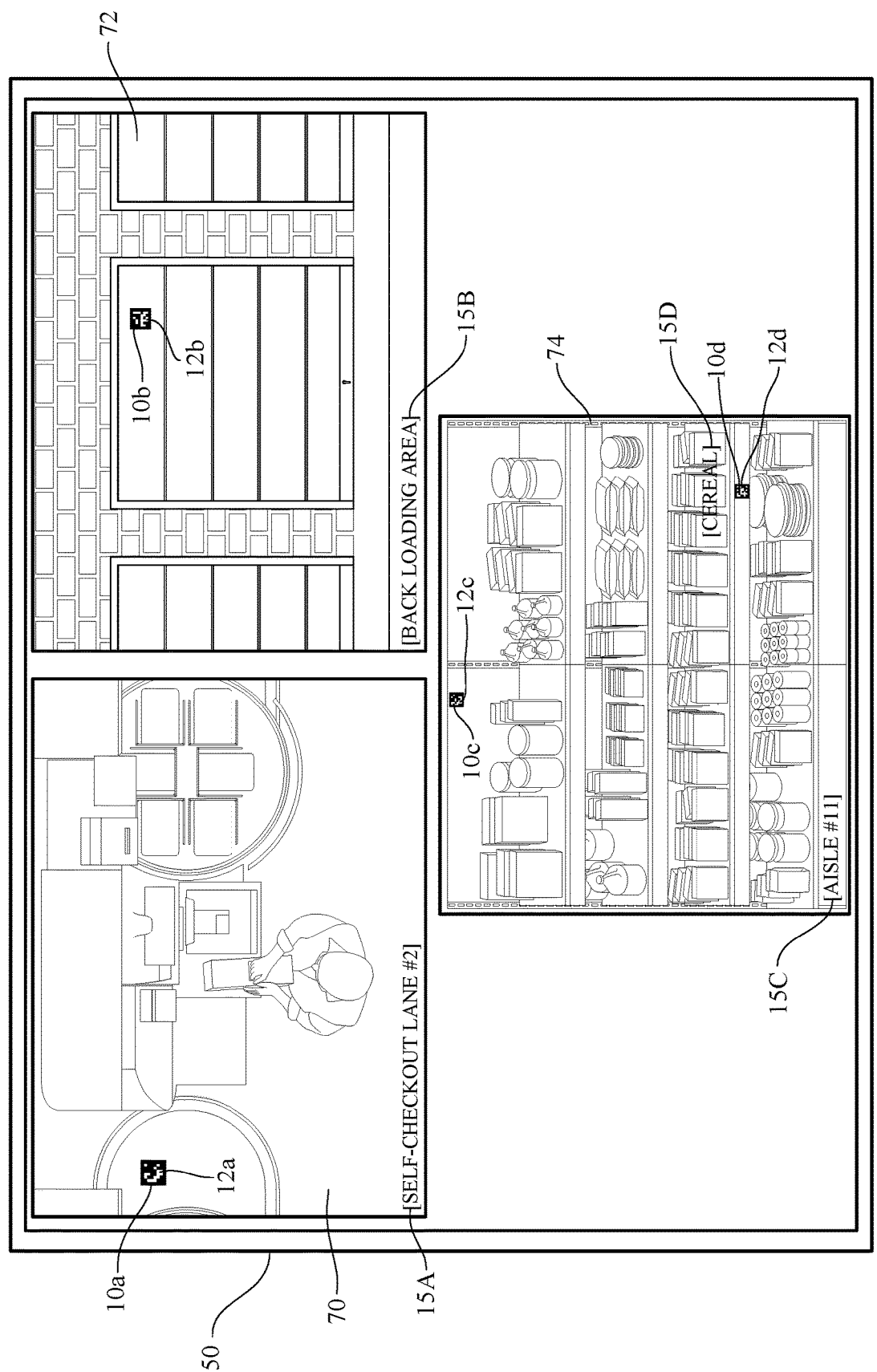
FIG. 8 is an image showing an exemplary display included in the system of FIG. 1 and displaying a visual feed provided by cameras of FIG. 1.

Referring again generally to FIGS. 1-4, a camera 40 and at least one fiducial marker 10a, 10b, 10c, 10d are positioned in each of the locations within the store intended to be monitored by the VMS 100. In this exemplary embodiment, the first fiducial marker 10a and one camera 40 are each positioned in a first location 70 within the store corresponding to "Self-Checkout Lane #2", the second fiducial marker 10b and another camera 40 are each positioned in a second location 72 within the store corresponding to a "Back Loading Area", and the third and fourth fiducial markers 10c, 10d, and yet another camera 40 are positioned in a third location 74 within the store corresponding to "Aisle #11", as is also shown in FIG. 8. Each camera 40 has an identity and is configured to capture images 60, 62, 64 of the objects and areas within its field of view. Each camera 40 is also in communication with the central computer 20, such that the images captured by the camera 40 can be transmitted to the central computer 20 for subsequent processing and/or transmittal, as further described below. Images 60, 62, 64 captured by a camera 40 can be transmitted to the central computer 20 in quick succession, such that the camera 40 effectively provides a visual feed of the objects and area within the field of view of the camera 40.

Referring now, more specifically, to FIGS. 2-4, FIG. 2 is a first image 60 captured by a camera positioned in the first location 70 of the store, FIG. 3 is a second image 62 captured by a camera positioned in the second location 72 of the store, and FIG. 4 is a third image 64 captured by a camera positioned in the third location 74 of the store. As reflected by the presence of the first fiducial marker 10a, the second fiducial marker 10b, and the third and fourth fiducial markers 10c, 10d within the first image 60, the second image, 62, and the third image 64, respectively, each fiducial marker 10a, 10b, 10c, 10d in the system is positioned within the field of view of at least one camera. The cameras 40 utilized in accordance with the system can be any camera of sufficient resolution to provide a general image of the indicia 12a, 12b, 12c, 12d present on the fiducial markers 10a, 10b, 10c, 10d, and thus are not particularly limited to any specific type of camera. For instance, in one embodiment, the cameras 40 within the system may comprise surveillance cameras within a store. The dimensions of the fiducial markers 10a, 10b, 10c, 10d and/or positioning of the cameras 40 relative to the fiducial markers 10a, 10b, 10c, 10d can be adjusted to account for the resolution limitations of different cameras.

The system includes data stored within the database 30 that identifies location information, product information, or both location information and product information that is associated with the identity of each fiducial marker 10a, 10b, 10c, 10d within the system. In this way, the database 30 includes information that links a particular fiducial marker 10a, 10b, 10c, 10d to a particular location within the store, a particular product or group of products within the store, or both. The system also includes data which identifies the specific camera 40 from which a particular image 60, 62, 64 received by the central computer 20 corresponds, i.e, the system stores data regarding the identity of each camera. The identity of each camera 40 within the system is preferably stored on the database 30 and can also be stored locally on the central computer 20 and/or embedded as metadata within the images 60, 62, 64 captured by the cameras 40. In addition to the foregoing, the database 30 is also configured to store data regarding the location of each camera 40 within the system once identified in the manner described below.

Location information associated with the identity of a particular fiducial marker 10a, 10b, 10c, 10d corresponds to a predetermined location within the store at which the fiducial marker 10a, 10b, 10c, 10d is positioned. The location with which a particular fiducial marker 10a, 10b, 10c, 10d is associated can refer to different landmarks within the store (e.g., register #5, self-checkout lane #3, store entrance, store exit, etc.) and/or different sections within the store (e.g., aisle #6, produce area, meat department, bakery, etc.). On the other hand, product information associated with the identity of a particular fiducial marker 10a, 10b, 10c, 10d corresponds to a particular product or group of products located in close proximity to the location at which the fiducial marker 10a, 10b, 10c, 10d is positioned within the store. The product or group of products to which a fiducial marker 10a, 10b, 10c, 10d is associated can refer to categories of products present in the store (e.g., boxed cereal, canned vegetables, flour, detergent, etc.), general types of products present in the store (e.g., CHEERIOS® cereal, (General Mills, Minneapolis, Minn.) or TIDE® detergent (The Proctor and Gamble Co. Cincinnati, Ohio)), or specific types of products present in the store (e.g., 15 oz. CHEERIOS® or 128 oz. Tide® with fabric softener).

In the exemplary embodiment shown in FIGS. 1-4, the first fiducial marker 10a, the second fiducial marker 10b, and the third fiducial marker 10c each have location information, which corresponds to the location of the respective fiducial markers within the store, associated with their respective identities in the database 30. More specifically, within the database 30, the identity of the first fiducial marker 10a is associated with a first location 70 of "Self-Checkout Lane #2", the identity of the second fiducial marker 10b is associated with a second location 72 of "Back Loading Area", and the identity of the third fiducial marker 10c is associated with a third location 74 of "Aisle #11". Further, within the database 30, the fourth fiducial marker 10d has product information associated with its identity that corresponds to the products that are proximate to the location where the fourth fiducial marker 10d is positioned. Specifically, as shown in FIGS. 4 and 8, the identity of the fourth fiducial marker 10d is associated with the category of products corresponding to "Cereal."

Turning now to interaction between the central computer 20 and database 30, the database 30 is in communication with the central computer 20, such that a query of the data within the database 30 can be initiated from the central computer 20 and sent to the database 30 from the central computer 20. Information matching the query can then be received by the central computer 20 from the database 30 for further processing and analysis. In some embodiments, instructions to add, insert, or otherwise modify data within the database 30 may also be initialized from the central computer 20 and sent to the database 30 from the central computer 20 to effectuate changes within the database 30. In some embodiments, a database management system may be utilized to facilitate the transmission of queries from the central computer 20 to the database 30 and query results from the database 30 to the central computer 20. Moreover, in some embodiments, data stored within the database 30, such as data regarding the identity of a fiducial marker 10*a*, 10*b*, 10*c*, 10*d* and the location information associated therewith, may be stored in one or more relational tables within the database 30.

The central computer 20 is also in communication with each display 50 of the system, such that the central computer 20 can selectively transmit the visual feeds provided by the cameras 40 to one or more displays 50 for display thereon. In this regard, and as would be recognized by those skilled in the art, any display suitable for such purposes, such as a computer or television monitor, can be utilized.

Referring now more generally to FIG. 1, communications between the central computer 20, the one or more cameras 40, and the one or more displays 50 can be facilitated through direct communication between the various devices via a local network. Alternatively, in some embodiments, communications between the central computer 20, the one or more cameras 40, and the one or more displays 50 can also be facilitated through an internet connection, satellite communication, or other similar communications network or known means of data transport, such that the one or more cameras 40 and the one or more displays 50 can communicate with the central computer 20 remotely located from the area where the one or more cameras 40 and/or one or more displays 50 are located. Along these lines, the database 30 can be stored locally with the central computer 20 or, alternatively, the database can be stored externally, such as on a server or cloud database accessible by the central computer 20. With respect to the central computer 20, it will be readily apparent to one of ordinary skill in the art that software running on the central computer 20 causes computer-readable instructions stored in a memory component of the central computer 20 to be executed by a microprocessor of the central computer 20, thereby causing the central computer 20 to perform the various operations described herein. Such computer-readable instructions can be readily coded into computer readable form using standard programming techniques and languages by one of ordinary skill in the art.

Referring now generally to FIGS. 1-6, FIG. 6 is a flow diagram of an exemplary method for mapping camera location in a video management system, which utilizes an exemplary system made in accordance with the present invention. In this exemplary method, in step 102, each camera 40 captures an image 60, 62, 64 of the objects and area within its field of view and transmits the same to the central computer 20 for processing. Each fiducial marker 10*a*, 10*b*, 10*c*, 10*d* is within the field of view of at least one camera 40. Accordingly, each fiducial marker 10*a*, 10*b*, 10*c*, 10*d* of the system is thus represented within at least one of the captured images 60, 62, 64, as shown in FIGS. 2-4. The transmitted images 60, 62, 64 are then received and processed by the central computer 20 to determine the identity of each fiducial marker 10*a*, 10*b*, 10*c*, 10*d* in step 104. In processing the images 60, 62, 64, the central computer 20 typically uses computer-vision software to identify the presence of the fiducial markers 10*a*, 10*b*, 10*c*, 10*d* within the received images 60, 62, 64. In some implementations, the computer-vision software for identifying the presence of fiducial markers 10*a*, 10*b*, 10*c*, 10*d* can include a library of programming functions directed to real-time computer vision applications, such as OpenCV. Machine learning frameworks such as TensorFlow, Pytorch, Darknet, Sonnet, or Keras can also be utilized along with their various model supports (cnn, rcnn, fast rcnn, faster rcnn, or mask rcnn) and trained to identify the selected and placed fiducial markers. In some instances, the computer-vision software can also be customized for a particular application as desired using coding languages, such as C, C++, Python, Java and/or other languages as would be apparent to those skilled in the art.

Referring now generally to FIGS. 2-5, the outer border 16 of the fiducial marker provides a visual identifier that is consistent across the indicia 12*a*, 12*b*, 12*c*, 12*d* of each fiducial marker 10*a*, 10*b*, 10*c*, 10*d*, which, in turn, assists the central computer 20 in differentiating the fiducial markers 10*a*, 10*b*, 10*c*, 10*d* from other objects or areas represented within the received images 60, 62, 64. The outer border 16 of the indicia 12*a*, 12*b*, 12*c*, 12*d* thus facilitates fast initial detection of the fiducial markers 10*a*, 10*b*, 10*c*, 10*d* within the received images 60, 62, 64. Upon detecting the presence of a fiducial marker 10*a*, 10*b*, 10*c*, 10*d*, the central computer 20 analyzes the inner binary matrix 14 within the indicia 12*a*, 12*b*, 12*c*, 12*d* of the fiducial marker 10*a*, 10*b*, 10*c*, 10*d* to determine its identity.

Figure 5:
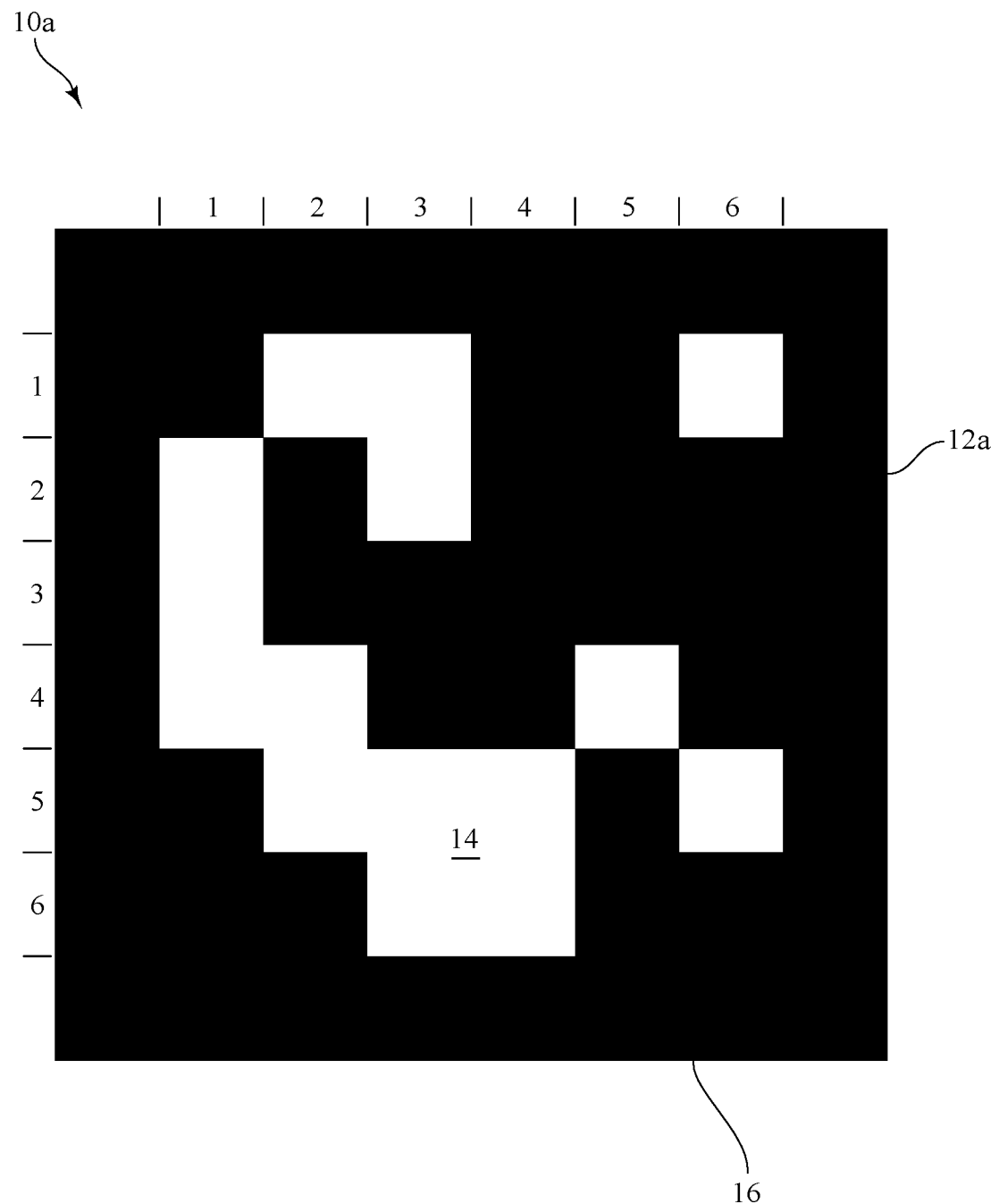
FIG. 5 is an enlarged view of the first fiducial marker of FIG. 2.
Figure 7:
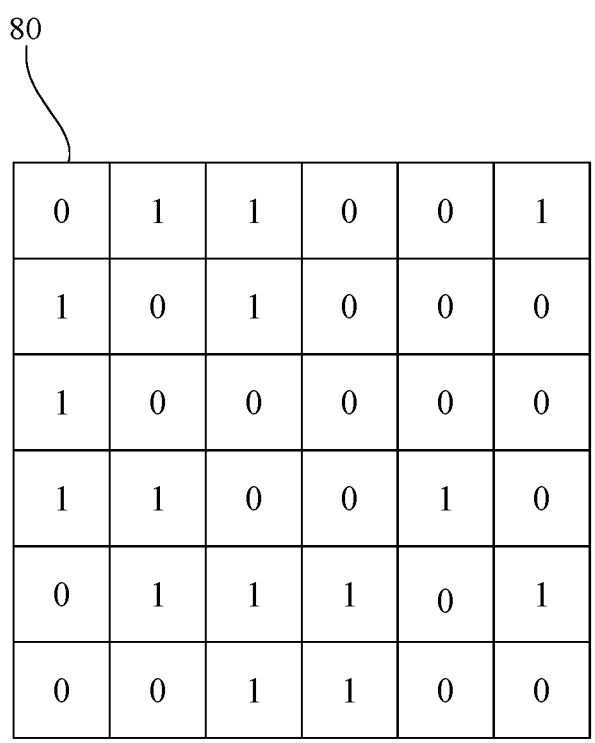
FIG. 7 is a numeric-based binary matrix depicting how the first fiducial marker of FIG. 2 can be perceived by the central computer of the system of FIG. 1.

Referring now to FIGS. 2, 5, and 7, when analyzing the inner binary matrix 14 of each indicia 12*a*, 12*b*, 12*c*, 12*d*, the central computer 20 can perceive the shaded matrix defining the inner binary matrix 14 of the indicia 12*a*, 12*b*, 12*c*, 12*d* of the fiducial markers 10*a*, 10*b*, 10*c*, 10*d* as a numerical matrix 80 with binary values. For instance, FIG. 7 provides a general representation as to how the central computer 20 may perceive the inner binary matrix 14 of the indicia 12*a* of the first fiducial marker 10*a* shown in FIGS. 2 and 5 as a numeric matrix 80. As shown by comparing FIGS. 5 and 7, the black squares within the 6×6 inner binary matrix 14 of the indicia 12*a* correspond to a numeric value of "0" while the white squares within the inner binary matrix 14 correspond to a numeric value of "1." In some implementations, to ascertain the identity of each fiducial marker 10*a*, 10*b*, 10*c*, 10*d*, the central computer 20 may convert the numeric values within the numeric matrix 80 corresponding to the inner binary matrix 14 of the indicia 12*a*, 12*b*, 12*c*, 12*d* of the fiducial markers 10*a*, 10*b*, 10*c*, 10*d* to a single numeric value equal to a value assigned as the identity of the fiducial marker 10*a*, 10*b*, 10*c*, 10*d*. Alternatively, the inner binary matrix 14 or the numeric matrix 80 corresponding to the inner binary matrix 14 of each fiducial marker 10*a*, 10*b*, 10*c*, 10*d* can be associated with an assigned identity value within the database 30. In such implementations, the central computer 20 can query the database 30 with the inner binary matrix 14, the numeric matrix 80 corresponding to the inner binary matrix 14, or information derived from the inner binary matrix 14 or corresponding numeric matrix 80 to determine the identity associated with the respective fiducial markers 10*a*, 10*b*, 10*c*, 10*d*. In another implementation, a three-dimensional barcode matrix can be utilized as a method of fiducial marking in which there is no constraint of using colors and basic geometric shapes with numeric values to implement a human readable code version of fiducial markers that can be identified with computer vision techniques. For example, in some implementations, the fiducial marker can be a number "4" where the letter is in white and is surrounded by a blue box. In that implementations, the blue color could indicate the "frozen section" of a grocery store, while the number "4" is the designation of the marker in that area meeting some predefined area of the facility.

Referring again to FIG. 6, in step 106, the central computer 20 queries the database 30 using the identity of the fiducial marker 10a, 10b, 10c, 10d to retrieve and identify what location information, if any, is associated with the determined identity of the fiducial marker 10a, 10b, 10c, 10d, thereby determining the location of the fiducial marker 10a, 10b, 10c, 10d. Based on the query communicated to the database 30, information is then transmitted from the database 30 to the central computer 20. For example, to determine the location of the first fiducial marker 10a, the central computer 20 communicates a query to the database 30 to select and return the location information associated with the identity of the first fiducial marker 10a to the central computer 20. In this case, because the first fiducial marker 10a is positioned at and has location information corresponding to the first location 70 of the store, the central computer 20 will receive location information of "Self-Checkout Lane #2" from the database 30. Similar queries regarding the second and third fiducial markers 10b, 10c would thus result in the central computer 20 receiving the location information of "Back Loading Area" and "Aisle #11", respectively. In the event the identity of the fiducial marker 10a, 10b, 10c, 10d does not have location information associated with it, preferably, no information or a null indication will be received from the database 30, thus indicating that the fiducial marker 10a, 10b, 10c, 10d does not have any location information associated with it.

After the location of a fiducial marker 10a, 10b, 10c, 10d is identified by the central computer 20, the central computer 20 subsequently identifies the camera 40 having obtained the image 60, 62, 64 and identifies the camera as being located in or as showing the same location of the respective fiducial marker 10a, 10b 10c, 10d. For example, in determining the location of the camera 40 based on the location of the fiducial marker 10a, 10b 10c, 10d, the central computer 20 will identify a camera 40 having captured an image 62 of the second fiducial marker 10b, which is associated with the second location 72 of "Back Loading Area," as also being located in the "Back Loading Area" of the store. Accordingly, to map the location of each camera 40 within the system to a particular location within the store, in step 108, the central computer 20 associates the identity of each camera 40 with the location information of those fiducial markers 10a, 10b, 10c, 10d which are within its field of view. Once the location of each of the cameras 40 is determined, in step 110, the central computer 20 then updates the database 30 to store data regarding the association between the identity of each camera 40 and its determined location by transmitting such instructions to the database 30.

In some implementations, it is of course contemplated that a single camera 40 can have multiple fiducial markers 10a, 10b, 10c, 10d within its field of view, where the fiducial markers 10a, 10b 10c, 10d each have an identity that is associated with certain location information. For example, in some implementations, instead of having an identity associated with product information, the identity of the fourth fiducial marker 10d may have location information associated therewith corresponding to a particular shelf module 90 on which the fourth fiducial marker 10d is positioned, such as "Shelf Module #2". Accordingly, in this example, the central computer 20 would associate the identity of the camera 40 having captured the image 64 of the third and fourth fiducial markers 10c, 10d with the location of both "Aisle #11" and "Shelf Module #2".

Figure 6:
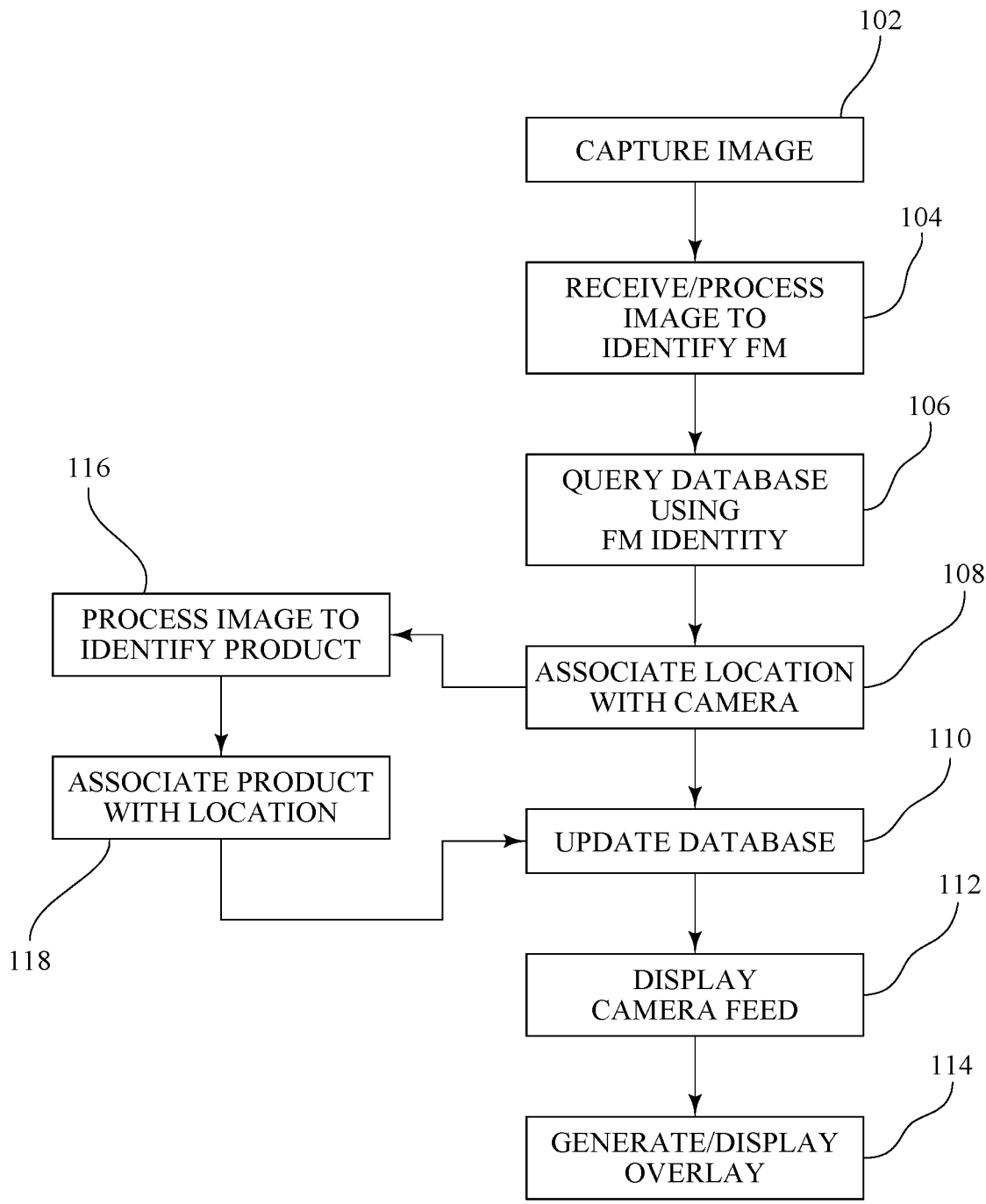
FIG. 6 is a flow diagram of an exemplary method for mapping camera location in a video management system.

Referring now to FIGS. 6 and 8, in step 112, the visual feed provided by the cameras 40 is subsequently transmitted from the central computer 20 to one or more displays 50 within the system, thereby enabling remote monitoring of the areas to which the one or more cameras 40 correspond. For example, and as perhaps shown best in FIG. 8, the visual feed from the cameras 40 located at the first location 70 corresponding to "Self-Checkout Lane #2", the second location 72 corresponding to "Back Loading Area", and the third location 74 corresponding to "Aisle #11" are each transmitted and displayed on a single display 50. Of course, the feeds from the one or more cameras 40 may similarly be transmitted to multiple displays 50 in alternative implementations. For example, in some implementations, the visual feed from each camera 40 may be transmitted to a different display 50 within the system.

Referring still to FIGS. 6 and 8, to enable users to readily distinguish between the different feeds provided on the display 50, in step 114, the central computer 20 is also configured to generate one or more overlays 15a, 15b, 15c, 15d for each feed shown on the display 50. Each overlay 15a, 15b, 15c, 15d generally relates to a particular feed and identifies the identity of one or more of the fiducial markers 10a, 10b, 10c, 10d shown within the feed, the identified location of the camera 40 providing the feed, product information associated with the identity of the fiducial markers 10a, 10b, 10c, 10d shown within the feed, or a combination thereof. Each overlay 15a, 15b, 15c, 15d is transmitted by the central computer 20 to the display 50 and corresponds to a particular feed relating to the overlay 15a, 15b, 15c, 15d. In this particular implementation, four overlays 15a, 15b, 15c, 15d: a first overlay 15a, a second overlay 15b, a third overlay 15c, and a fourth overlay 15d are generated by the central computer 20 and transmitted to the display 50 on which the feeds showing the first location 70, the second location 72, and the third location 74 are presented. As shown in FIG. 8, in this particular implementation, the first, second, and third overlays 15a, 15b, 15c identify the location of the camera 40 providing the feed to which the overlay 15a, 15b, 15c relates. As such, the first overlay 15a states "[Self-Checkout Lane #2]" and is positioned on the portion of the display 50 on which the feed corresponding to the first location 70 is presented, the second overlay 15b states "[Back Loading Area]" and is positioned on the portion of the display 50 on which the feed corresponding to the second location 72 is presented, and the third overlay 15c states "[Aisle #11]" and is positioned on the portion of the display 50 on which the feed corresponding to the third location 74 is presented. The fourth overlay 15d identifies the product information associated with the identity of the fourth fiducial marker 10d and thus states "[Cereal]" and is presented on the display 50 on which the fourth fiducial marker 10d is presented.

Referring generally to FIGS. 2-4 and 6, in some implementations, the exemplary method for mapping camera location in a video management system further includes mapping the location of products 92 represented within the images 60, 62, 64 received by the central computer 20 during step 104. Thus, to this end, the identity of some or all of the products 92 represented within such images 60, 62, 64 may be identified in step 116. In some implementations, the central computer 20 is trained via machine learning to identify the identity of a product 92 based on an image of that product. For example, during training, a product-recognition algorithm on the central computer 20 can be trained using a training dataset including the known identity of the products 92 within the field of view of the cameras 40 of the system. For instance, in some implementations, the identity of each product 92 is known by virtue of the Universal Product Code (UPC) located on the packaging of the product 92 that corresponds to the identity of the product 92. Thus, in some embodiments, the database 30 may be configured to store UPC information in association with the product information stored therein. During training, the central computer 20 thus receives an image of a product 92 as input, processes the image using the product-recognition algorithm, and outputs an initial identity determination for the product 92. The initial identity determination is subsequently compared against the known identity of the product 92 based on the UPC of the product. The product-recognition algorithm is adjusted accordingly based on the results of such comparison. The foregoing training process is repeated until the product-recognition algorithm achieves a determined acceptable level of performance. To aid in the development and/or training of the product-recognition algorithm, the central computer 20 can utilize machine-learning software. In some embodiments, the machine-learning software may include a library of programming functions directed to machine-learning modeling and classification, such as TensorFlow. To aid in the initial detection of a product 92, the central computer 20 may utilize computer-vision software, such as OpenCV. The product-recognition algorithm can be adapted to identify a product 92 in terms of the category of products to which it belongs, the general type of product it is, or the specific type of product it is.

Alternatively, images 60, 62, 64 received by the central computer 20 may be processed, using computer-vision software, to locate which portions of a received image 60, 62, 64 including a product 92, if any, and to identify the geometric shape of such product 92. For example, in FIG. 4, the product 92a shown in the third image 64 corresponding to the third location 74 within the store is identified as having a generally rectangular shape. To link the geometric shape of a product 92 with the identity of the product 92, the database 30 can further store product shape information in association with the product information stored therein. As such, the geometric shape of product 92 may correspond to a specific category of products, a general type of product, or a specific product. Using the determined shape of the object, the central computer 20 then queries the database 30 to determine which category of products, general type of products, or specific products represented within the product information stored in the database 30 and having the identified shape associated therewith. The results returned from such query thus correspond to the identity of the product 92. For instance, referring again to product 92a in FIG. 4, the query of the database 30 may return results indicating that the rectangular shape of the product 92a is associated with the general product type of "Cereal."

In some implementations, the central computer 20 may alternatively compare products 92 represented within the images 60, 62, 64 received from the cameras 40 to various images stored within the system of products to which the identity is already known and associated. For instance, in some implementations, the system may store images corresponding to the products represented within the planograms of a store as well as data regarding the identity of the products represented within such images. The images stored within the system thus act as a template to which products represented in the images 60, 62, 64 received from the cameras 40 can be compared. Upon determining a match between a template image stored within the system and an image 60, 62, 64 received from a camera 40 or determining the two images are similar to an acceptable degree, the central computer 20 associates the identity associated with the template image with the product represented within the image 60, 62, 64 and received from the cameras 40.

Referring again to FIG. 6, in step 118, after the identity of a product 92 has been determined by the central computer 20, by any of the above-described manners, the central computer 20 associates the determined identity of the product 92 with the determined location of the camera 40 having captured the image 60, 62, 64 of the product 92 (i.e., the determined location associated with the camera 40 in step 108 is associated with the identity of the product 92). As further shown in FIG. 6, following such association, the central computer 20 may update the database 30 to store data regarding the association between the identity of the product and its determined location by transmitting instructions to the database 30.

Referring now generally to FIGS. 1-4, 6, and 9, FIG. 9 is a flow diagram of an exemplary method for selecting a desired view in a video management system. Like the exemplary method for mapping camera location in a video management system, the exemplary method for selecting a desired view in a video management system also includes determining the identity of the fiducial markers 10a, 10b, 10c, 10d present within the system. As such, the exemplary method for selecting a desired view in a video management system includes capturing, from a plurality of cameras, images 60, 62, 64 of the fiducial markers 10a, 10b, 10c, 10d in the system in step 202 and receiving and processing the images 60, 62, 64 to determine the identity of the fiducial markers 10a, 10b, 10c, 10d in step 204. The manner in which the images 60, 62, 64 are captured in step 202 and the manner in which such images 60, 62, 64 are received and processed by the central computer 20 to determine the identity of the fiducial markers 10a, 10b, 10c, 10d in step 204 are typically the same as described above with respect to steps 102 and 104 of the exemplary method for mapping camera location in a video management system and illustrated in FIG. 6.

Referring now generally to FIGS. 1-4 and 9, in step 206, the database 30 is queried by the central computer 20 to identify which fiducial markers 10a, 10b, 10c, 10d have an identity associated with information relating to a view desired for display. The query initiated by the central computer 20 can include criteria relating to a particular location 70, 72, 74, a particular product 92, and/or a combination thereof that is within the field of view of one or more of the cameras 40. For example, the query may instruct the database 30 to return the identity of each fiducial marker 10a, 10b, 10c, 10d in the system having an identity associated with desired location to be viewed, such as location information corresponding to a "Back Loading Area," or an identity associated with desired product information, such as information corresponding to "Cereal."

Referring still to FIGS. 1-4 and 9, in step 208, based on the criteria of the query communicated to the database 30 and the determined identity of one or more fiducial markers 10a, 10b, 10c, 10d, information about a location of each of the one or more fiducial markers 10a, 10b, 10c, 10d is retrieved by the central computer 20 via a transmission from the database 30 to the central computer 20. One or more of the fiducial markers 10a, 10b, 10c, 10d transmitted from the database 30 can then be selected as fiducial markers 10a, 10b, 10c, 10d having an identity associated with or present at a desired location information (and/or desired product information). Again, using the example queries of "Back Loading Area" and "Cereal", in this exemplary implementation, the identity of the second fiducial marker 10b, which is associated with location information corresponding to the second location 72 in the store (i.e., the "Back Loading Area" of the store), and the identity of the fourth fiducial marker 10d, which is associated with product information corresponding to the category of products of "Cereal", can be retrieved by the central computer 20 and selected as desired.

Referring still to FIGS. 1-4 and 9, in step 210, the central computer 20 uses the identities of the selected subset of fiducial markers 10a, 10b, 10c, 10d to identify and select a subset of cameras 40 within the system and transmits the feeds from the selected subset of cameras 40 on one or more of the displays 50 within the system. To select the subset of cameras 40, the central computer 20 selects the images including the selected subset of fiducial markers 10a, 10b, 10c, 10d from the images transmitted in step 202 and determines which cameras 40 within the system obtained the selected images. In some implementations, the central computer 20 may utilize metadata contained within the images 60, 62, 64 to identify which cameras 40 within the system obtained the selected images.

Figure 9:
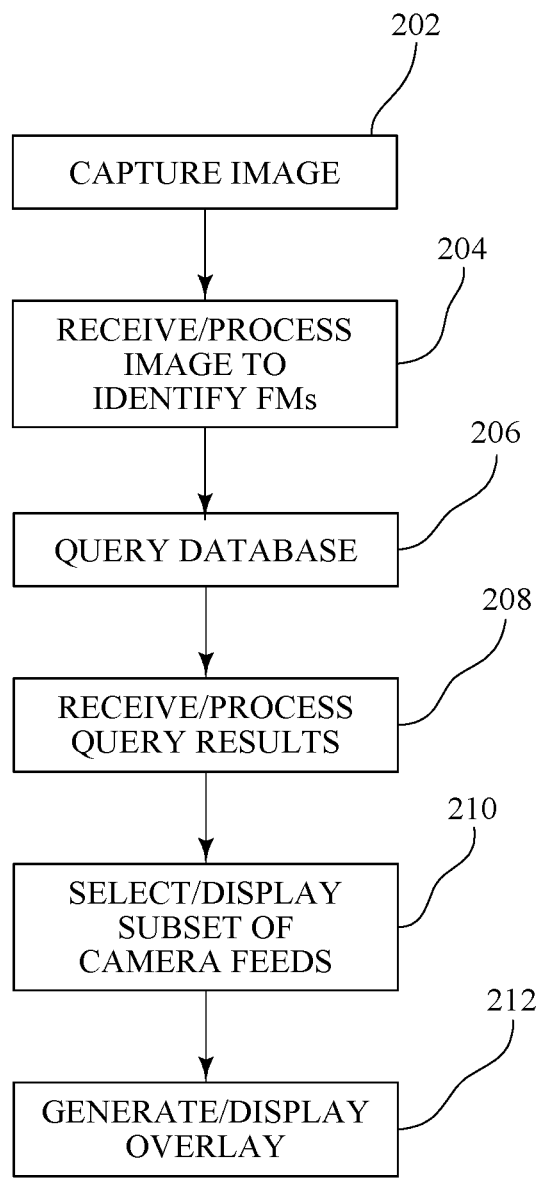
FIG. 9 is a flow diagram of an exemplary method for selecting a desired view in a video management system.

Referring generally to FIGS. 8 and 9, in some implementations, the exemplary method for displaying a desired view in a video management system may further include the central computer 20 generating an overlay 15a, 15b, 15c, 15d for each feed and transmitting the generated overlays 15a, 15b, 15c, 15d to the one or more displays 50 on which the respective feeds are displayed in step 212. The overlays 15a, 15b, 15c, 15d generated by the central computer 20 can relate to the identity of the fiducial markers 10a, 10b, 10c, 10d shown within a particular feed, the location information associated with the identity of the fiducial markers 10a, 10b, 10c, 10d shown within a particular feed, and/or the product information associated with the identity of the fiducial markers 10a, 10b, 10c, 10d shown within a particular feed. In this exemplary implementation, a first, second, and third overlay 15a, 15b, 15c correspond to the location information associated with the identity of the first, second, and third fiducial markers 10a, 10b, 10c, while the fourth overlay 15d corresponds to the product information associated with the identity of the fourth fiducial marker 10d.

One of ordinary skill in the art will recognize that additional embodiments and implementations are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A method for mapping a camera location in a video management system, comprising:
   positioning a fiducial marker at a predetermined fixed location, the fiducial marker including indicia corresponding to an identity of a fiducial marker;
   receiving, via a central computer, an image obtained by a camera positioned at a fixed location, the image showing the fiducial marker;
   processing the image on the central computer to determine the identity of the fiducial marker based on the indicia;
   retrieving information about a location of the fiducial marker from a database storing data about the fiducial marker, the information about the location of the fiducial marker being retrieved based on the determined identity of the fiducial marker; and
   identifying a location of the camera based on the location of the fiducial marker shown in the image obtained by the camera.

2. The method of claim 1, further comprising a step of displaying, via a display in communication with the central computer, a feed corresponding to a field of view of the camera.

3. The method of claim 2, further comprising a step of displaying an overlay corresponding to at least one of the identity of the fiducial marker and/or the location of the camera on the display.

4. The method of claim 1, further comprising a step of storing the location of the camera in the database.

5. The method of claim 1, further comprising a step of processing the image on the central computer to determine an identity of a product shown in the image and identifying a location of the product based on the location of the camera.

6. The method of claim 5, further comprising a step of updating the database with the location of the product.

7. The method of claim 1, wherein the predetermined fixed location at which the fiducial marker is positioned is in a retail store.

8. The method of claim 7, wherein the retail store is a grocery store.

9. A system for mapping a location of a camera in a video management system, comprising:
   a fiducial marker including indicia corresponding to an identity of the fiducial marker, the identity of the fiducial marker associated with a predetermined fixed location of the fiducial marker;
   a central computer;
   a database in communication with the central computer, the database configured to store data about the identity of the fiducial marker and to store location information associated with the identity of the fiducial marker; and
   a camera in communication with the central computer, the camera being positioned at a fixed location to obtain an image showing the indicia of the fiducial marker,
   wherein the central computer is configured to process the image to determine the identity of the fiducial marker based on the indicia, and
   wherein the central computer is further configured to identify a location of the camera based on the location of the fiducial marker shown in the image obtained by the camera, the fiducial marker associated with the determined identity of the fiducial marker.

10. The system of claim 9, further comprising a display in communication with the central computer, the display configured to show a feed corresponding to a field of view of the camera.

11. The system of claim 10, wherein an overlay corresponding to at least one of the identity of the fiducial marker, the location of the camera, and product information associated with the identity of the fiducial marker is provided on the display.

12. The system of claim 9, wherein the indicia includes a binary matrix.

13. The system of claim 12, wherein the indicia further includes a border enclosing the binary matrix.

14. The system of claim 9, wherein the database is configured to store data about the location of the camera.

15. The system of claim 9, wherein the camera is positioned in a retail store to obtain an image of a product, and wherein the central computer is configured to process the image of the product to determine an identity of the product and to identify a location of the product based on the location of the camera.

16. The system of claim 15, wherein the central computer is configured to identify a location of the product based on the location of the camera, and wherein the database is configured to store data about the product.

17. A method for selecting a desired view in a video management system, comprising:

receiving images from a plurality of cameras on a central computer, each of the received images showing one or more fiducial markers, each of the one or more fiducial markers including an indicia corresponding to an identity of a respective one of the one or more fiducial markers, and the identity of each of the one or more fiducial marker associated with a predetermined fixed location of the fiducial marker;

processing each of the images on the central computer to determine the identity of each of the one or more fiducial markers in each of the images;

retrieving information about a location of each of the one or more fiducial markers from a database storing data about each of the one or more fiducial markers, the information about the location of each of the one or more fiducial markers based on the determined identity of each of the one or more fiducial markers;

identifying a fixed location of each of the plurality of cameras based on the location of the one or more fiducial markers shown in the image obtained by the respective camera;

selecting one or more fiducial markers identified as being present at a desired location; and identifying each of the plurality of cameras having obtained an image of the selected one or more fiducial markers at the desired location.

18. The method of claim 17, further comprising displaying, via a display in communication with the central computer, a feed corresponding to a field of view for each of the plurality of cameras at the desired location.

19. The method of claim 18, further comprising a step of displaying an overlay corresponding to at least one of the identity of the one or more fiducial markers at the desired location and/or the location of each of the plurality of cameras on the display.

20. The method of claim 17, wherein the desired location is a predetermined location in a retail store.

* * * * *